Patented Jan. 2, 1951

2,536,056

UNITED STATES PATENT OFFICE 2,536,056

MULTIPLE HEATING-STEP METHOD OF PRODUCING A COMPOSITE COATED OBJECT

Charles H. Hempel, Manitowoc, Wis., assignor to Heresite & Chemical Company, a corporation of Wisconsin No Drawing. Application April 22, 1944, Serial No. 532,351

6 Claims. (Cl. 154—140)

This invention relates to a plasticized oil-free phenol-formaldehyde resin and more particularly to a pigmented resin of the type described in my Patents 2,198,939 and 2,253,235.

The invention is intended primarily to overcome a difficulty which occurs when phenol-formaldehyde resins which are oil-free are applied to the interior of vessels having small openings or any vessel in which the circulation of air to the coated parts is seriously restricted. On such pieces there is a tendency which increases in accordance with the lack of circulation of air, for surface hardening to occur during the initial treatment in the oven which causes blistering or bubbling of the coating during baking.

Furthermore, there is some tendency for runs or sags to occur in the coating.

These difficulties are overcome by the present resin. In addition, the present material may be applied in a greater thickness in a single operation and it has increased adhesion to clean metal surfaces which have not been physically etched either by acid or sand. In addition, the present product has somewhat greater elasticity in its ability to withstand the strains of fabrication.

The plasticizers used retard the polymerization of the resin and it has been found possible to coat various parts of containers which are to be assembled, substantially complete the baking, without completing polymerization, then assembling the products and completing the baking after assembly. The resin retains sufficient plasticity so that during the final baking the coatings which are in contact will soften sufficiently to permit them to blend together forming a tight liquid-proof seal.

Pure phenol-formaldehyde resins are not compatible with drying or non-drying oils. Suitable plasticizers, however, may be added to such resins, examples of the plasticizers being polyhydric alcohols such as glycerine, organic phosphates such as tricresyl phosphate, higher boiling ketones such as camphor oil or esters of glycerine such as triacetin.

Any one of these plasticizers may be added to the resins described in the Hempel Patent No. 2,198,939 in amounts of 5 to 30% depending upon the type of application for which the coating is to be employed and also upon the characteristics of the plasticizer. The plasticizer should, however, be one having a boiling point above 250° C. During the baking and drying, while the solvents are being removed and the resins being converted from the A stage to the B stage, the plasticizer remains in the film.

During the final conversion of the resin from the B stage to the C stage, however, the plasticizer is substantially entirely evaporated.

The invention has been employed successfully in the manufacture of the following items, particularly on the interior of many of them:

Aerial torpedoes
Submarine torpedoes
Torpedo flasks
Superchargers for high altitude planes
Diesel engine mufflers, exhaust manifold chambers, blocks and valve springs
Steel conduits
Refrigerator cooling coils
Oil reservoir tanks for oil filters
Condensing, cooling and heating condenser coils
Impeller type acid pumps
Fluid lines for liquid cooled aircraft.

As an example of the invention, a pure phenol-formaldehyde resin is prepared by incorporating with 100 parts phenol, 100 parts of 40% by volume formaldehyde and one part of ammonium hydroxide (26° Bé.). The ammonium hydroxide acts as a catalyst and any other suitable catalyst of the alkali type may be employed in its place, for instance, sodium carbonate, potassium carbonate, ammonium carbonate and others. In addition to this, from 15 to 30 parts of one of the plasticizers are added, such as camphor oil, triacetin, camphor, or glycerine.

These ingredients are boiled in a reflux container until the resin precipitates and the condensation is then continued for one-half hour more. The water present is then removed by vacuum distillation until the temperature of the resin reaches 108°–115° C. and the sample remains clear and is without stickiness under cold water. The resultant resin is then dissolved in ethyl alcohol to form approximately 70% solution of the resin.

This solution can be used in its clear state or it can be mixed with suitable pigments or fillers and ground in a pebble mill until it is free from coarse particles. The grinding process is the same as described in Hempel Patent 2,198,939 and 2,253,235.

Following are four formulas as examples of the invention:

| | Parts by weight |
|---|---|
| 1. Phenol | 100 |
| Formaldehyde 40% volume | 100 |
| Ammonium hydroxide | 2 |
| Light camphor oil | 20 |
| 2. Phenol | 100 |
| Formaldehyde 40% volume | 100 |
| Ammonium hydroxide | 2 |
| Camphor, synthetic | 20 |
| 3. Phenol | 100 |
| Formaldehyde 40% volume | 100 |
| Ammonium hydroxide | 2 |
| Glycerine | 25 |
| 4. Phenol | 100 |
| Formaldehyde 40% volume | 100 |
| Ammonium hydroxide | 2 |
| Triacetin | 25 |

Such prepared coatings give a remarkable resistance against all kinds of chemicals, especially against concentrated mineral acids, as sulphuric, hydrochloric and phosphoric. As a matter of fact, the coating is not attacked after being exposed to such solutions for 3,000 hours. Also, it is unaffected by exposure to sea water for 5,000 hours.

The metal surfaces to be coated with material prepared in this manner should be previously sandblasted or acid etched in order to secure maximum adhesion; the method of application is described in Hempel Patent 2,198,939. Coating applied in this way produces maximum adhesion and durability.

Nevertheless, an outstanding feature of this coating is that it may be applied even to plain degreased metal surfaces, that is, not sandblasted or etched, and remarkable adhesion obtained. For instance, a steel panel with a film thickness of .0025" to .003" coated in this manner can be bent to an angle of 180° and the coating does not flake off. This is not known of any other coating prepared from pure phenol-formaldehyde resins.

The foregoing detailed description is given for clearness of understanding only and no unnecessary limitations should be understood therefrom.

What I claim as new, and desire to secure by Letters Patent is:

1. The multiple heating-step method of preparing a coated object which comprises coating the object with an alkali-catalyzed phenol-formaldehyde oil free resin film containing 5 to 30 per cent by weight of the resin of a plasticizer, said plasticizer having a boiling point in excess of 250° C. and being inert to the resinifying reaction, the mixture of said resin and plasticizer being dissolved in a volatile solvent, subjecting the object to a first heating to dry the mixture and evaporate the solvent while converting the resin film to the B stage, and then subjecting said object to a second heating to convert the resin film to the C stage.

2. The method of claim 1 in which said plasticizer is glycerine.

3. The method of claim 1 in which said plasticizer is camphor.

4. The method of claim 1 in which said plasticizer is tricresyl phosphate.

5. The multiple heating-step method of producing a composite coated object which comprises separately coating the parts of the object with a film of alkali-catalyzed phenol-formaldehyde oil free resin containing 5 to 30 per cent by weight of the resin of a plasticizer, said plasticizer having a boiling point in excess of 250° C. and being inert to the resinifying reaction, the mixture of said resin and plasticizer being dissolved in a volatile solvent, subjecting each of the parts to a first heating to dry the mixture and evaporate the solvent while converting the resin film to the B stage, assembling the object to bring the coatings on the respective parts thereof into contact and then subjecting the assembled object to a second heating to convert the resin film to the C stage whereby the contacting surfaces blend to form a continuous surface.

6. The multiple heating-step method of producing a composite resin coated object non-absorbent of the resin which comprises separately coating the parts of the non-absorbent object with a film of alkali catalyzed phenol formaldehyde oil-free resin containing five to thirty per cent by weight of the resin of a plasticizer, said plasticizer having a boiling point in excess of 250° C. and being inert to the resinfying action, the mixture of said resin and plasticizer being dissolved in a volatile solvent, subjecting each of the parts to a first heating at a relatively low temperature to dry the mixture and evaporate the solvent while converting the resin film to the B stage, assembling the object to bring the resin films upon the respective parts thereof into contact with each other and then subjecting the assembled object to a separate second heating at a relatively high temperature to convert the resin films to the C stage.

CHARLES H. HEMPEL.

REFERENCES CITED

The following references are of record in the file of this patent:

UNITED STATES PATENTS

| Number | Name | Date |
|---|---|---|
| 735,278 | Luft | Aug. 4, 1903 |
| 1,019,407 | Bakeland | Mar. 5, 1912 |
| 1,107,703 | Redman | Aug. 18, 1914 |
| 1,242,593 | Redman et al. | Oct. 9, 1917 |
| 1,497,396 | Wry | June 10, 1924 |
| 1,586,850 | Smith | June 1, 1926 |
| 1,695,566 | Turkington | Dec. 18, 1928 |
| 1,795,703 | Baur | Mar. 10, 1931 |
| 1,987,694 | Mains | Jan. 15, 1935 |
| 2,011,213 | Ehrenzweig | Aug. 13, 1935 |
| 2,185,477 | Thompson | Jan. 2, 1940 |
| 2,198,939 | Hempel | Apr. 30, 1940 |
| 2,218,373 | Alexander | Oct. 15, 1940 |
| 2,376,213 | Watson et al. | May 15, 1945 |